(12) United States Patent
Lugo

(10) Patent No.: US 10,667,533 B2
(45) Date of Patent: Jun. 2, 2020

(54) FISH SCALING, CUTTING BLADE GLOVE WITH ATTACHED KNIFE SHARPENER AND FLASH LIGHT

(71) Applicant: Crystal M. Lugo, Virginia Beach, VA (US)

(72) Inventor: Crystal M. Lugo, Virginia Beach, VA (US)

( * ) Notice: Subject to any disclaimer, the term of this patent is extended or adjusted under 35 U.S.C. 154(b) by 0 days.

(21) Appl. No.: 14/727,963

(22) Filed: Jun. 2, 2015

(65) Prior Publication Data

US 2015/0366228 A1    Dec. 24, 2015

Related U.S. Application Data

(60) Provisional application No. 62/013,735, filed on Jun. 18, 2014.

(51) Int. Cl.
| | | |
|---|---|---|
| *F21V 33/00* | (2006.01) | |
| *A22C 25/02* | (2006.01) | |
| *A22C 25/00* | (2006.01) | |
| *B26B 27/00* | (2006.01) | |
| *A41D 19/015* | (2006.01) | |

(52) U.S. Cl.
CPC .......... *A22C 25/025* (2013.01); *A22C 25/006* (2013.01); *B26B 27/007* (2013.01); *A41D 19/0157* (2013.01); *A41D 19/01564* (2013.01); *A41D 19/01594* (2013.01)

(58) Field of Classification Search
CPC .. A22C 25/006; A22C 25/025; F21V 33/0008
See application file for complete search history.

(56) References Cited

U.S. PATENT DOCUMENTS

| | | | |
|---|---|---|---|
| 2,819,521 A | 1/1958 | Parker | |
| 2,895,139 A * | 7/1959 | Compton | A22C 25/006 2/161.8 |
| 4,004,295 A | 1/1977 | Byrnes, Sr. | |
| 4,149,296 A | 4/1979 | Stanford | |
| 5,345,368 A * | 9/1994 | Huff | A41D 19/0037 2/160 |
| 6,298,489 B1 | 10/2001 | Cox | |
| 7,162,748 B2 | 1/2007 | Hottner et al. | |
| 7,179,162 B1 | 2/2007 | Twiner | |
| 8,038,310 B1 * | 10/2011 | Hale | A41D 19/0157 2/159 |
| 8,370,966 B2 | 2/2013 | Hendon et al. | |
| 2004/0016042 A1 | 1/2004 | Kim | |

FOREIGN PATENT DOCUMENTS

| | | |
|---|---|---|
| CN | 201854715 | 6/2011 |
| CN | 102613280 | 8/2012 |

* cited by examiner

*Primary Examiner* — Karabi Guharay
(74) *Attorney, Agent, or Firm* — Law Office of Jerry Joseph, PLC; Jerry Joseph

(57) ABSTRACT

A glove for facilitating grasping a fish while scaling, gutting, cleaning, and cutting the fish. The glove has four elongated finger portions and an elongated thumb portion extending from a palm region. A plurality of fish scaling blades is disposed on several outer surface of the glove. The glove is typically formed from a material typically having a roughened texture and is impervious to the fish cleaning by-products such as fish entrails, fish scales, and the like. An opening allows access of a hand of a wearer to a hollow interior portion and to fingers and the thumb. An optional flashlight and/or sharpening stone may be attached to the glove.

10 Claims, 4 Drawing Sheets

FISH SCALING, CUTTING BLADE GLOVE WITH ATTACHED KNIFE SHARPENER AND FLASH LIGHT

RELATED APPLICATIONS

This application claims priority in accordance with 37 CF.R. ¶1.19(e) to U.S. Provisional Patent Application Ser. No. 62/013,735 filed for NEW AND IMPROVED FISH SCALING, CUTTING BLADE GLOVE WITH ATTACHED KNIFE SHARPENER AND FLASH LIGHT filed Jun. 18, 2014 which is included herein in its entirety by reference.

FIELD OF THE INVENTION

The invention pertains to devices for scaling, cleaning and gutting fish and, more particularly, to gloves which are adapted for wearing on each hand of a user having cutting and sharpening devices built into or attached thereto to expeditiously accomplish these functions.

BACKGROUND OF THE INVENTION

An important process in the commercial fishing industry is the scaling, gutting and cleaning of fish. There are some mechanical devices that may be available to aid in these processes. However, to avoid damage to the fish bodies, usually newly caught fish, the scaling, gutting and cleaning processing typically involves handling the fish by humans. Fish scalers that are mechanical devices used to remove scales from fish prior to cleaning are well known in the art. However all known fish scalers typically are manually operated in a reciprocating motion parallel to the surface of a fish whose scales are being removed. Scalers typically have a number of sharp protrusions or points that are raked along the outer skin of a fish in a direction opposite to the direction of growth or attachment of the scales. These points engage the external edges of the fish scales and pull or force the scale to detach from the skin of the fish.

Newly caught fish are frequently wet or slippery from having been in the water. In addition, when the fish are scaled after returning to the dock, water is sometimes used as a rinsing agent during the process of cleaning the fish, to wash away the scales and other tissue that may be removed during the cleaning process. Because the skin of the fish is slippery, it is necessary to grasp the fish firmly, and to hold it tightly, during the scaling process. If heavy duty gloves are not used, it is possible for the person doing the scaling to nick, catch, abrade, or otherwise injure the hand that is holding the fish, especially with the sharp points of the scalar.

Numerous devices have been provided for assisting in the preparation of a fish for human consumption. Among these devices have been numerous gloves with various surfaces and attachments for easily performing the necessary cleaning, scaling, and gutting operations. However, the location, configuration, positioning, and design of the glove surfaces and implements have been unsatisfactory for performing these required fish preparation operations.

It would, therefore, be advantageous to provide suitable hand protection to prevent injuries that can occur when a fish scalar inadvertently comes into contact with the hand holding the fish during a scaling operation. It would be further advantageous to provide hand protection that includes fish scaling apparatus to improve the efficiency of the fish scaling operation while protecting the hands of the wearer.

DISCUSSION OF THE RELATED ART

Several attempts to provide such protection are found in the prior art. For example, U.S. Pat. No. 2,895,139 for FISH CLEANING GLOVE SET, issued Jul. 21, 1959 to Harold G. Compton discloses a glove set in which one glove is provided with fish grasping elements and the other glove is provided with a fish gutting knife and scaling elements. These gloves perform a multi-featured service in protecting the hands of the operator from damage, and also in allowing the efficient and very satisfactory cleaning of the fish with a minimum of time, labor and equipment. In this invention, one glove is provided with a pin feature by means of' which the tail of the fish may be secured in the hands of the operator so as to hold it in firm engagement. The other glove is provided with sealing elements on three of its fingers and a gutting knife in conjunction with one of the scaling elements on one finger. The gutting knife makes possible the gutting of the fish in one simple, quick slash while the tail is grasped by the gloved hand of the operator. Then, without changing tools or gloves in any manner, the gutted fish can then be laid on its side and scaled by scraping the scaling elements on the fingers of the glove along' the sides of the fish. The scaling device is so formed that the curved contour of the fish is mated with the edges of the scaling device which greatly improves the efficiency of the scaling operation.

U.S. Pat. No. 4,004,295 for PROTECTIVE GLOVE CONSTRUCTED OF FLEXIBLE STRANDS OF METAL WIRE AND FIBER YARN issued Jan. 25, 1977 to Robert M. Byrnes, Sr. discloses a protective glove for use by persons engaged in various operations. In meat packing or processing plants such as an operator who uses a knife during various meat cutting procedures in which one hand usually holds the knife and manipulates it adjacent the other hand or other portions of the body which frequently results in accidental injury. The glove is constructed from a flexible fiber and a small wire fiber combined in a conventional manner of constructing gloves with the non-metallic fiber preferably being an aramid fiber having unique properties such as Kevlar® The metallic wire fiber or strands are flexible, quite strong and materially strengthens the glove and renders it more durable and aids in preventing penetration of the glove by a knife blade or the like. The glove is of light-weight construction and may be provided with various wrist lengths and without straps or buckles thereby eliminating failure of such items and the tendency of such items to catch on various machines and the like.

U.S. Pat. No. 4,149,296 for FISH HOLDING, SCRAPING, AND CUTTING BLADE GLOVE issued Apr. 17, 1979 to Franklin D. Stanford provides a glove having four elongated finger portions and an elongated thumb portion extending from a glove palm of a roughened material impervious to fish cleaning products, is provided with a molded-in finger sleeve for each finger portion having transverse corrugations for gripping a fish body. The end of each finger portion is provided with a plurality of accurately shaped scraping edges affixed thereto spaced in radially projecting planes about the end of said finger portions. A longitudinal slot is formed in the thumb portion for receiving a hardened blade projecting from an arcuate thumb conforming base which is insertable from the inside of the thumb portion through the slot.

U.S. Pat. No. 6,298,489 for CUTTING GLOVE ASSEMBLY issued Oct. 9, 2001 discloses a cutting glove assembly for providing a cutting tool which can be conveniently worn upon a user's hand. The cutting glove assembly includes a glove member including a palm portion, a thumb member extending from the palm portion, and an index finger member also extending from the palm portion; and also includes a cutting assembly being securely attached to the glove member.

U.S. Pat. No. 7,162,748 for HANDCOVERING issued Jan. 16, 2007 to Martin Hottner et al. teaches a handcovering (i.e., glove or mitten), comprising an outer shell and an inner glove insert adhered to the shell. The glove insert comprises a lining fabric laminated to a functional layer that is water vapor permeable waterproof. The inner glove insert is substantially free of folds or bunching of the insert inside the glove.

U.S. Pat. No. 7,179,162 for WATER CONNECTED FISH SCALER issued Feb. 20, 2007 to Johnnie E. Twiner provides a fish scalar assembly for removing scales from a fish such that scales and grime do not accumulate on a scraper. The assembly can be connected to a pressurized water source by threaded coupling having an adapter. A flexible tube on the adapter transports water between the water source and a nozzle attached to the scraper. Water flows from an outlet of the nozzle over the scraper to prevent the accumulation of scales and grime on a scraping portion of the scraper. The outlet of the nozzle is placed at a distance from the scraping portion to prevent to clogging of the outlet.

U.S. Pat. No. 8,370,966 for ROOFING GLOVE issued Feb. 12, 2013 to Luke Hendon et al. teaches a roofing glove that includes a fitted protective covering receivable to a hand of a user, at least one spike having an anchor and a sharp protrusion extending from the glove and narrowing at a distal tip, anchored within the covering at a first predetermined location, and at least one grip pad disposed upon the covering at a second predetermined location. The at least one spike and the at least one grip pad are adapted to grip a surface, or the like, upon a fall by the wearer of the glove to prevent further fall or slide.

United States Published Patent Application Number 2004/0016042 for APPARATUS FOR PROTECTING GOLFER GRIP published Jan. 29, 2004 upon application by Tae Kyu Kim discloses a golf apparatus for protecting the golfer from inclement weather. The golf apparatus combines the covering or shield with a detachable glove. The covering or shield includes an opening that is elastic for allowing the gloved hand to be revealed for adjusting the gloved hand to the club. After the gloved hand grips the club, the parallel slit allows the palm area of the ungloved hand to extent through the slit area to facilitate proper alignment of the hands.

None of the patents and the published patent application, taken singly, or in any combination are seen to teach or suggest the novel fish scaling, cutting blade glove with attached knife sharpener and flashlight of the present invention.

SUMMARY OF THE INVENTION

In accordance with the present invention there is provided a glove having four elongated finger portions and an elongated thumb portion extending from a palm region formed from a material typically having a roughened texture and impervious to the fish cleaning by-products such as fish entrails, fish scales, and the like.

Therefore it is an object of the fish scaling, cutting blade glove with attached knife sharpener and flashlight in accordance with the invention to provide an improved fish cleaning, scraping, and gutting glove having improved features and configurations for holding fish, scraping fish, and also including a sharpener for sharpening fish gutting knives.

It is a further object of the fish scaling, cutting blade glove with attached knife sharpener and flashlight in accordance with the present invention to provide glove scraping members on at least portions of the fingers, thumb and palm to advantageously provide for scraping and cleaning fish with the fingers, thumb and palm of the wearer.

Therefore it is an object of the fish scaling, cutting blade glove with attached knife sharpener and flashlight in accordance with the present invention to provide a knife sharpener on the back surface of the glove.

Therefore it is an object of the fish scaling, cutting blade glove with attached knife sharpener and flashlight in accordance with the present invention to provide a waterproof flashlight attached to the glove proximate the middle of the wrist on the glove.

It is also an object of the fish scaling, cutting blade glove with attached knife sharpener and flash light in accordance with the present invention to have fish scaling blades attached to the back of the fingers and thumbs on the outside of the glove.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

The present invention provides a protective glove particularly useful to those preparing (e.g., scaling, gutting, cutting, etc.) fresh fish. The novel glove included scrapping blades and one or more other cutting blades on several portions of the outer surface of the glove. In addition, the glove typically has an attached sharpening stone or similar sharpening device attached to the outer surface of the glove. Finally, an optional flashlight may be attached of the glove, typically proximate the wrist of the glove.

Figure 1:
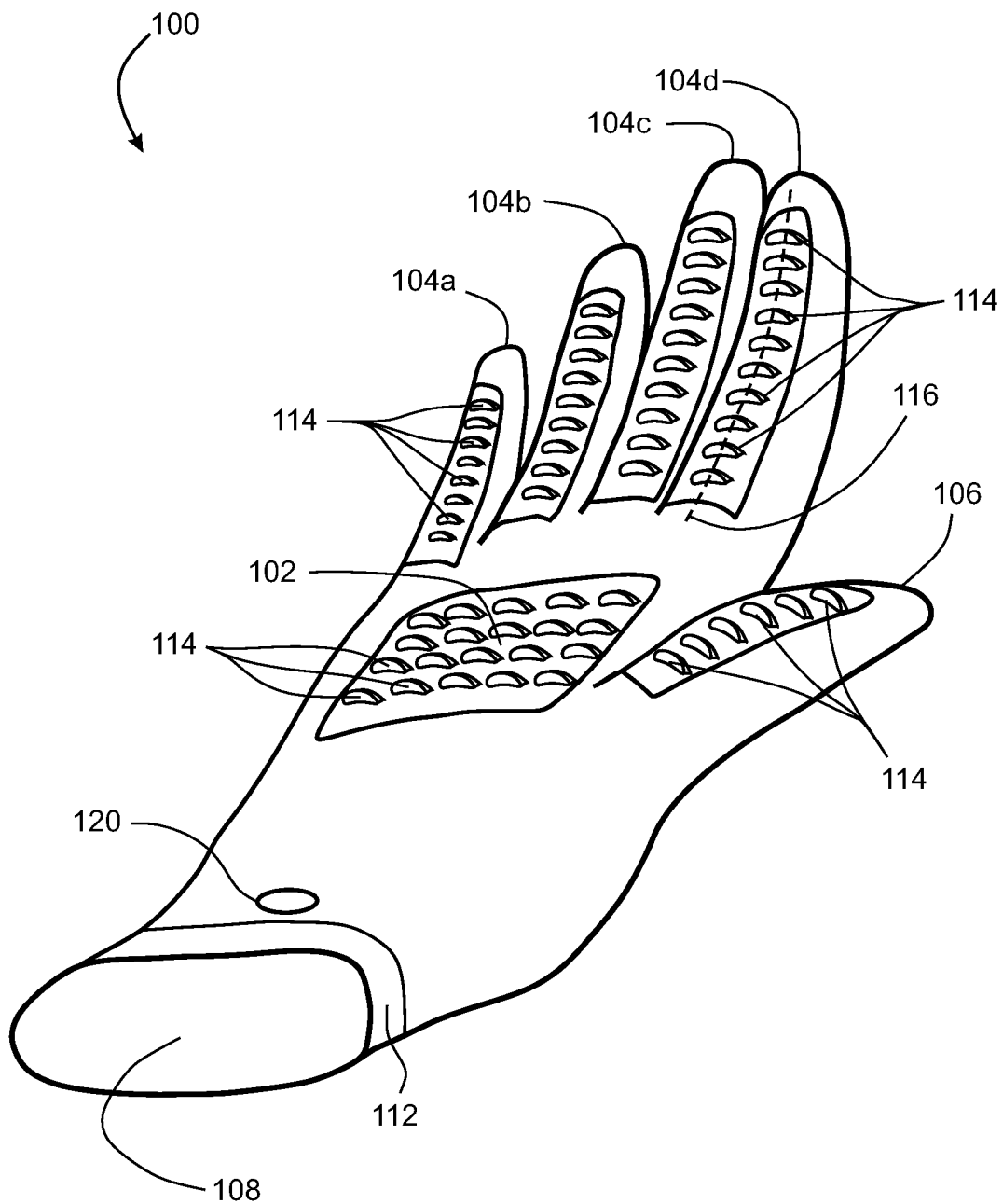
FIG. 1 is a perspective, schematic view of a palm side of a glove in accordance with the invention.

Referring first to FIG. 1, there is shown a perspective, schematic view of a palm side of a glove in accordance with the invention, generally at reference number 100.

Glove 100 is insulated, waterproof, light weight and may be formed from a single fabric layer or two or more layers. Glove 100 is typically used to grip fish for scaling, gutting, cutting, etc. The outer surface of the glove material may be a mesh like fabric that is resistant to punctures.

Glove 100 has a palm portion 102 with four elongated fingers 104a, 104b, 104c, 104d radiating outward therefrom. An elongated thumb 106 adjacent elongated finger 104a also radiates outwardly from palm region 102.

An opening 108 at a wrist region of glove 100 is provided to receive a hand, not shown and forming no part of the present invention. Typically, a wrist closure 112 is provided to seal a wearer's hand(s) inside the glove(s) 100. Closure 112 may use elastic, a hook-and-loop fastening systems, snaps, etc. to implement the closure. Other way for implementing a wrist closure 112 will be known to those of skill in the art. Consequently, the invention is not considered limited to the fastening devices or methods chosen for purposes of disclosure. Rather, any suitable alternative device or method is intended to be included in the claims of the present invention.

Figure 3A:
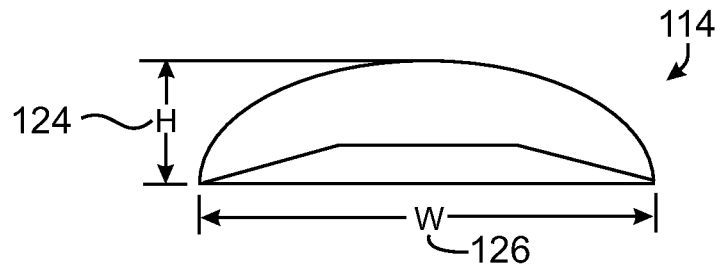
FIG. 3A is a front elevational, schematic view of a fish scaling blade forming a part of the glove of FIGS. 1, 2A and 2B.
Figure 3B:
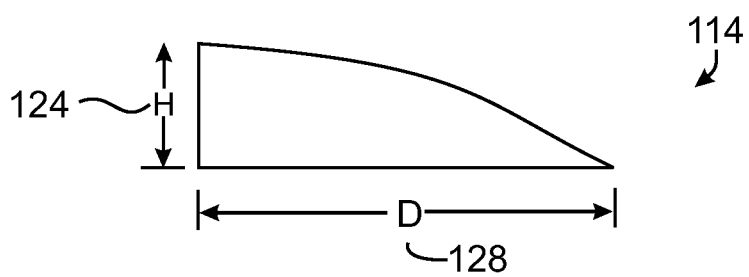
FIG. 3B is a side elevational, schematic view of the fish scaling blade of FIG. 3A.
Figure 3C:
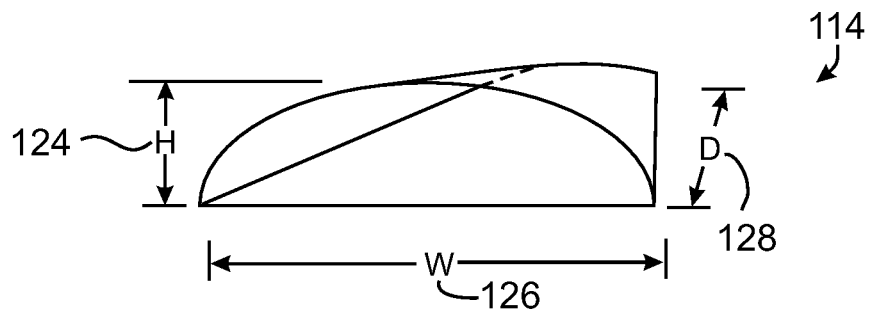
FIG. 3C is a front perspective, schematic view of the fish scaling blade of FIG. 3A.

A plurality of small short curved fish scaling blades 114 is disposed on several surfaces of glove 100. Fish scaling blades 114 are shown in more detail in FIGS. 3A-3C. Fish scaling blades 114 may be formed from a variety of materials to meet a specific operating requirement, for example, the species of fish to be scaled. Preferably stainless steel or another more exotic metal alloy such as Monel® or the like may be used. Monel is a trademark of the Special Metals Corporation group of companies. It will be recognized that many other possible alloys may be known to those of skill in the art. Consequently, the invention is not considered limited to a specific material but rather is intended to include any suitable metal or polymeric material.

Further, the size (height, width, length, etc.) of each fish scaling blade may be varied to optimize the scaling of a particular species of fish.

Finally, the spacing of fish scaling blades with respect to one another may also be varied for operational reasons.

Consequently, the dimensions, curvature, blade-to-blade spacing, and disposition areas are not considered limited to the specific value(s) illustrated or recited for purposes of disclosure. Rather the invention is intended to include any and all suitable variations of these parameters.

Typically fish scaling blades are disposed along the inside (i.e., the palm side) of elongated fingers 104a . . . 104d and thumb 106. Fish scaling blades 114 located in these regions are typically disposed in single rows of spaced apart fish scaling blades 114. It will be recognized that multiple rows of fish scaling blades 114 may be disposed on one or more of elongated fingers 104a . . . 104d or thumb 106. It will further be recognized that while fish scaling blades 114 are shown aligned along a single axis perpendicular to major axis 116 of fish scaling blades 114, it is possible to place individual fish scaling blades 114 in a pattern whereby individual ones of fish scaling blades 114 are offset with regard to axis 116.

Additional fish scaling blades 114 may be disposed in palm region 102 of glove 100.

Figure 2A:
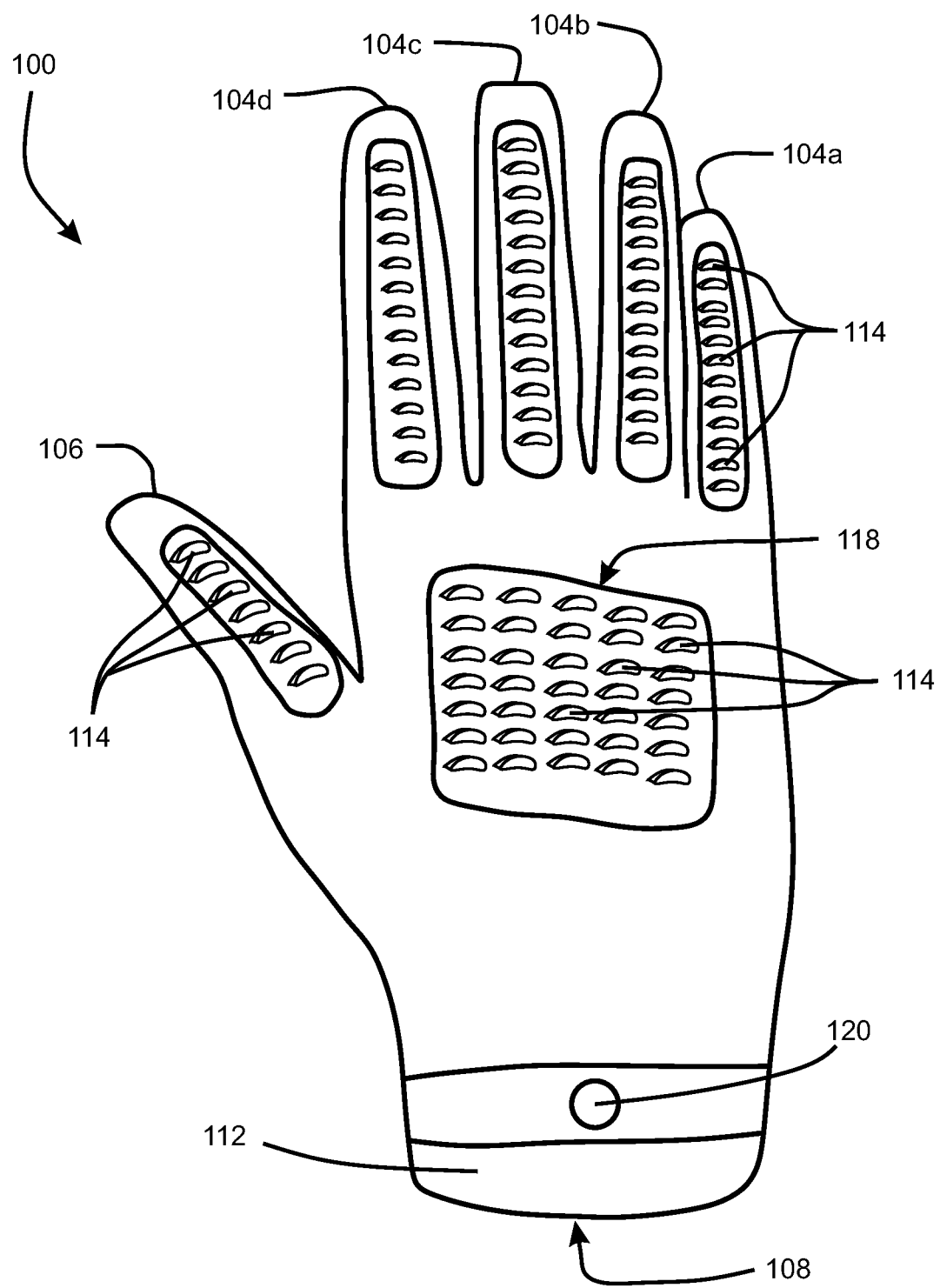
FIG. 2A is a perspective, schematic view of the back side of the glove of FIG. 1.

Referring now also to FIG. 2A there is shown a back perspective, schematic view of glove 100. As may readily be seen, additional fish scaling blades 114 may be disposed on back surfaces of elongated fingers 104a-104d, thumb 106, and a region 118 of the back surface (opposite the palm surface 102 of FIG. 1), of glove 100.

A flashlight 120 is shown disposed on wrist closure 112. In alternate embodiment's flashlight 120 may be disposed on a band, not shown, adjacent wrist closure 112 that allows flashlight 120 to be rotated circumferentially around glove 100 to allow shining light in a selectable direction to assist in operations involving glove 100.

Figure 2B:
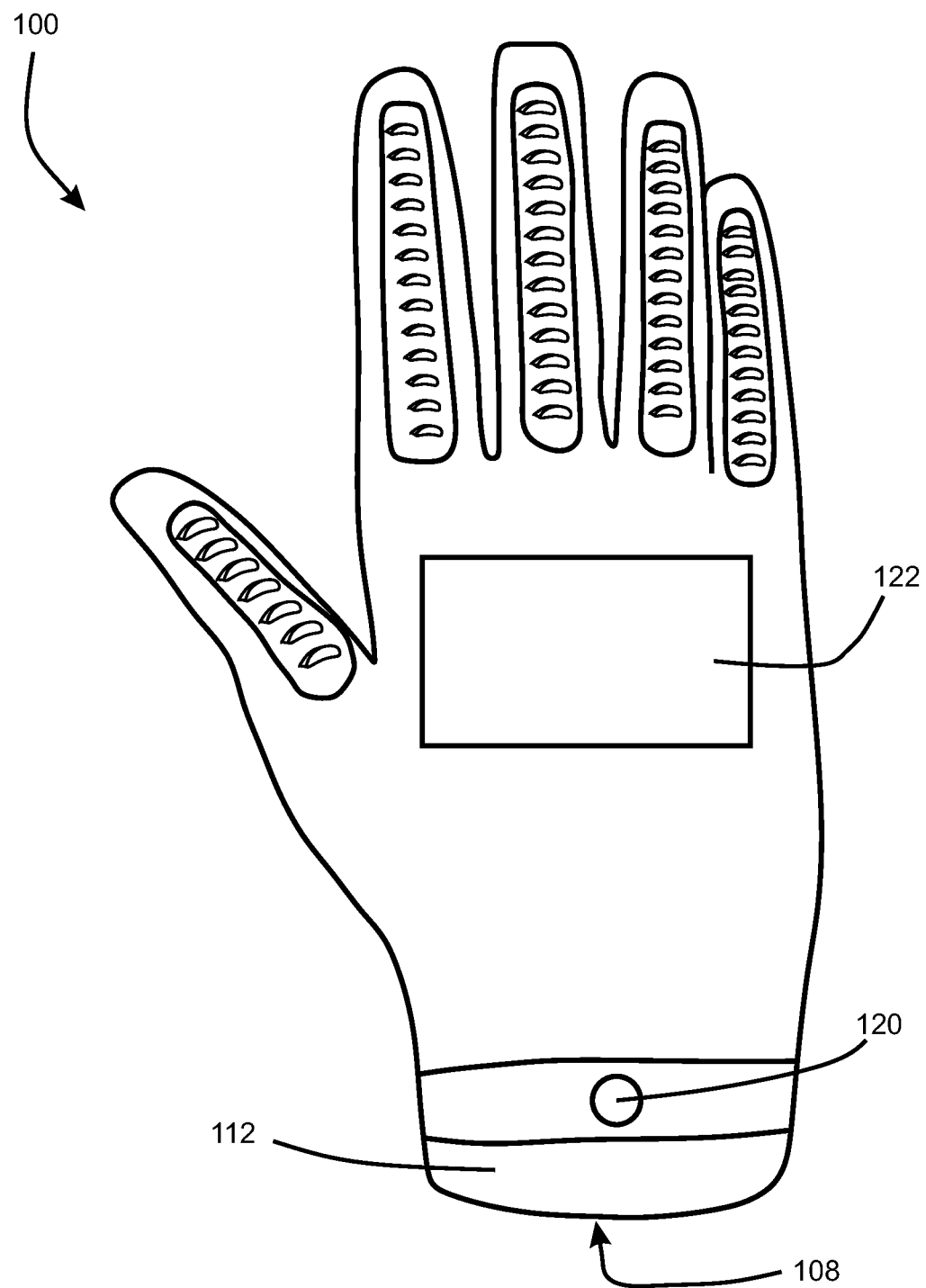
FIG. 2B is a perspective, schematic view of the back side of an alternate embodiment of the glove of FIG. 1.

Referring now also to FIG. 2B, there is shown a rear perspective, schematic view of an alternate embodiment of glove 100. In this embodiment, a blade sharpening stone or similar fastening device is affixed in region 122.

Referring now also to FIGS. 3A-3D, there are shown front elevational, side elevational, and front perspective, schematic views, respectively.

Each fish scaling blade 114 has a width W 126, a height H 124, and a depth D 128. As mentioned hereinabove, each of these dimensions as well as other dimensions not specifically identified such as the radius of curvature of the top of the fish scaling may be varied to meet a particular operating condition or requirement and consequently, the invention is not considered limited to the particular size and shape of fish scaling blade chosen for purposes of disclosure. Rather, the invention is intended to include any variations thereof within the scope of the disclosure.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A glove for scaling fish comprising,
    a) a hollow body having a central region comprising four elongated, hollow, fingers and a hollow thumb connected to and radiating outwardly there from, hollow portions of said four elongated fingers and said hollow thumb being contiguous with a hollow portion of said hollow body, and an opening to allow access of a hand of a user into said hollow body and said four elongated hollow fingers and said hollow thumb;
    b) a closure adjacent said opening to snug said glove to a wrist of a wearer thereof;
    c) a sharpening stone disposed on the back surface of said glove; and
    d) at least one column of spaced apart fish scaling blades disposed on at least a palm-facing surface of at least one of said four elongated hollow fingers and said hollow thumb, said at least one column of fish scaling blades disposed at a junction of said at least one of said four elongated four elongated hollow fingers and said hollow thumb and extending toward an end thereof.

2. The glove for scaling fish as recited in claim 1, wherein ones selected from said at least one column of spaced apart fish scaling blades are arranged in at least one row along at least one selected from the group consisting of: at least one of said hollow, elongated fingers, and said hollow thumb, said curvilinear raised portion of adjacent ones of spaced apart scaling blades being aligned substantially parallel to one another.

3. The glove for scaling fish as recited in claim 1, wherein said at least one column of spaced apart fish scaling blades are arranged in at least two parallel columns in a region selected from the group consisting of: an outer surface of a palm side of said glove, and fish scaling blades are disposed on the back surface of elongated fingers, and said hollow thumb of said glove and the said three blades, involving one elongated arrow shaped centered blade besides two smaller curvilinear raised portion blade on each side of the center blade of adjacent ones of spaced apart scaling blades being aligned substantially parallel to one another.

4. The glove for scaling fish as recited in claim 1, wherein said sharpening stone is disposed in a region selected from the group consisting of: a central portion of the back surface of a palm side of said glove, and a central portion of an outer surface of a side opposing said palm side of said glove.

5. The glove for scaling fish as recited in claim 1, wherein said glove is formed from a material that comprises at least one of the properties selected from the group consisting of: insulating, waterproofing, and puncture resisting.

6. The glove for scaling fish as recited in claim 1, wherein said closure encircles said opening.

7. The glove for scaling fish as recited in claim 6, wherein said closure comprises at least one selected from the group consisting of: an elastic band, a hook-and-loop fastening system, and snaps.

8. The glove for scaling fish as recited in claim 7 wherein said flashlight is disposed proximate said closure.

9. The glove for scaling fish as recited in claim 1, further comprising a flashlight affixed to an outer surface of said glove.

10. The glove for scaling fish as recited in claim 9, wherein said flashlight is movable along said closure.

\* \* \* \* \*